United States Patent [19]

Connor

[11] Patent Number: 5,562,307
[45] Date of Patent: Oct. 8, 1996

[54] VEHICLE STEERING COLUMN ADJUSTMENT AND ENERGY ABSORBING MECHANISM

[75] Inventor: John M. Connor, Stafford, England

[73] Assignee: The Torrington Company, Torrington, Conn.

[21] Appl. No.: 493,067

[22] Filed: Jun. 21, 1995

[30] Foreign Application Priority Data

Jul. 29, 1994 [GB] United Kingdom .................. 9415328

[51] Int. Cl.$^6$ ........................................... B62D 1/19
[52] U.S. Cl. ........................... 280/777; 74/493; 188/371
[58] Field of Search ........................... 280/775, 777; 74/492, 493; 188/371, 374

[56] References Cited

U.S. PATENT DOCUMENTS

| | | | |
|---|---|---|---|
| 4,539,861 | 9/1985 | Nishikawa | 280/775 |
| 5,009,120 | 4/1991 | Iseler et al. | 280/775 |
| 5,027,674 | 7/1991 | Nolte et al. | 74/493 |
| 5,029,489 | 7/1991 | Burmeister et al. | 280/775 |
| 5,148,717 | 9/1992 | Yamaguchi | 280/775 |

FOREIGN PATENT DOCUMENTS

| | | |
|---|---|---|
| 0641705 | 3/1995 | European Pat. Off. . |
| 1156423 | 6/1969 | United Kingdom . |
| 0375903 | 7/1990 | United Kingdom . |
| 2250241 | 6/1992 | United Kingdom . |
| 2260953 | 5/1993 | United Kingdom . |
| 2268125 | 1/1994 | United Kingdom . |
| 0600700 | 6/1994 | United Kingdom . |
| WO-A-9309016 | 5/1993 | WIPO . |
| WO-A-9400327 | 1/1994 | WIPO . |

*Primary Examiner*—Paul N. Dickson
*Attorney, Agent, or Firm*—Michael H. Minns

[57] ABSTRACT

A vehicle steering column adjustment and energy absorbing mechanism includes a steering column tube slidably mounted in a support member. A toothed slipper releasably engages with a toothed rack on the tube to lock the steering column relatively to the support member, a cam being provided to provide the locking action. The energy absorbing mechanism is provided by a strap which is rigidly joined to the slipper and is bent over a pin so that, in the event of vehicle crash with the rack and slipper locked together, energy imparted to the steering column causes the outer tube to move to cause the slipper to draw the strap around the pin, thereby to absorb energy.

20 Claims, 2 Drawing Sheets phytotoxicity
5,562,307

1

VEHICLE STEERING COLUMN ADJUSTMENT AND ENERGY ABSORBING MECHANISM

BACKGROUND OF THE INVENTION

This invention relates generally to vehicle steering column adjustment mechanisms and more particularly to an energy absorbing mechanism for steering column adjustment mechanisms.

Steering columns are known which incorporate locking mechanisms to allow for manual longitudinal, reach-adjustment of the steering wheel relative to the driver. Energy absorbing systems are also known to be incorporated in steering columns to absorb energy in the event of a frontal crash of the vehicle to inhibit severe injury to the driver.

A known problem has been of how to absorb chest impact energies of a driver in a vehicle which has a rake/reach or tilting steering column. Energy imparted by the driver on the steering column wheel in the event of impact is transmitted from the steering wheel down the steering column. With an adjustable steering column, it will be appreciated that the steering column can be moved up and down and in and out relative to supporting braketry remote from the steering wheel and this prevents the use of a fixed absorbing portion between the steering wheel and supporting braketry.

The foregoing illustrates limitations known to exist in present steering column energy absorbing mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a vehicle steering column adjustment and energy absorbing mechanism comprising a steering column part slidably mounted in a support member, said steering column part carrying first locking means for releasable engagement with second locking means, there being cam means to cause said first and second locking means to engage with one another to lock the steering column relatively to said support member; and said first and second locking means being joined to an energy absorbing device comprising an elongate member arranged around a further member over which said elongate member can be drawn, the arrangement being such that, in normal use, said steering column part can be slidably adjusted relative to said support member and locked in a desired position by said first and second locking means and, in the event of vehicle crash with said first and second locking means locked together, energy imparted to said steering column part moves said steering column part to cause said first and second locking means to draw said elongate member around said further member, thereby to absorb energy; and means for maintaining said first and second locking means in locking engagement in the event of a vehicle crash.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
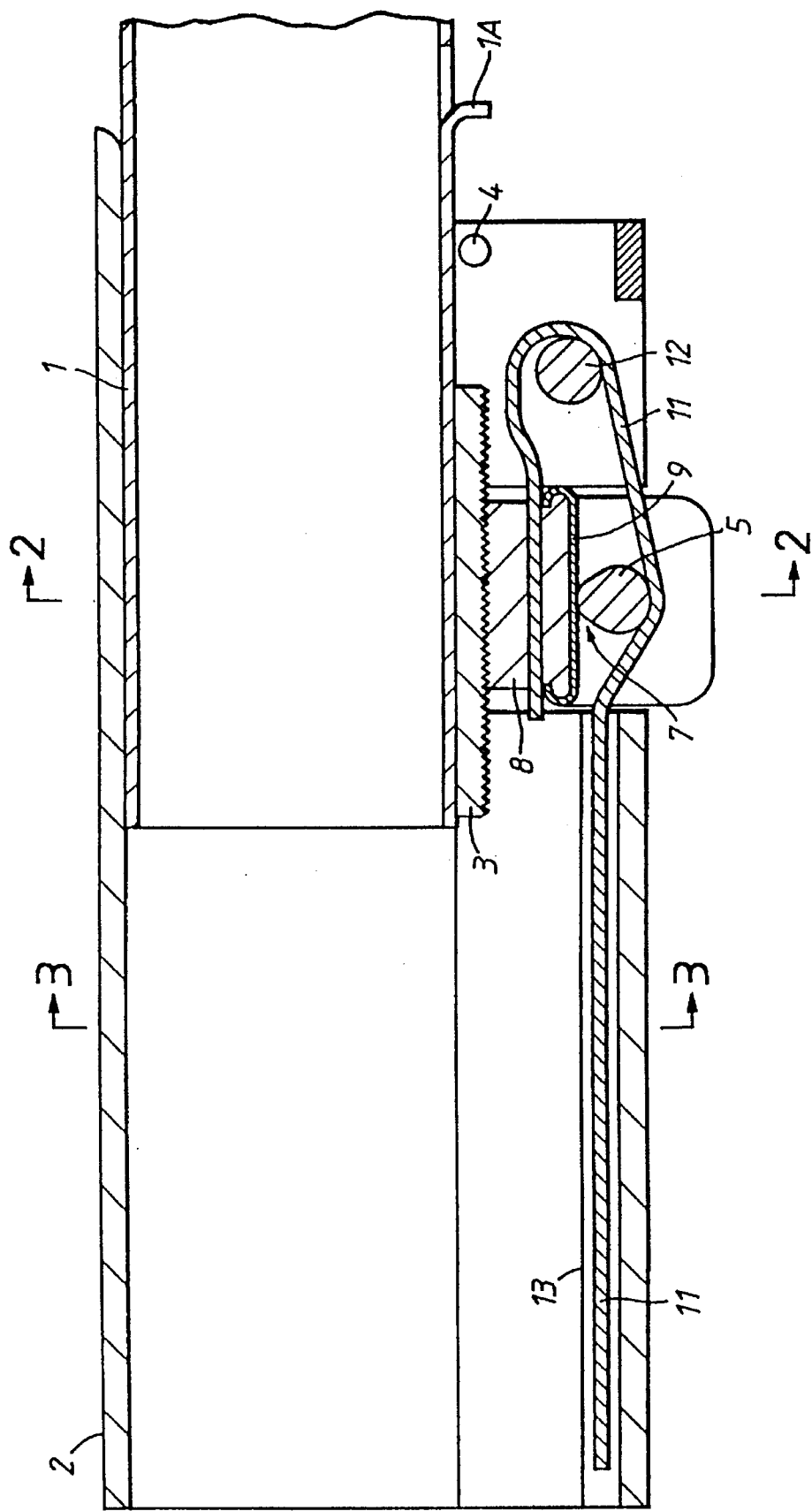
FIG. 1 is a sectional side view of part of a vehicle steering column and illustrating a steering column adjustment and energy absorbing mechanism, taken on line 1—1 of FIG. 2.
Figure 2:
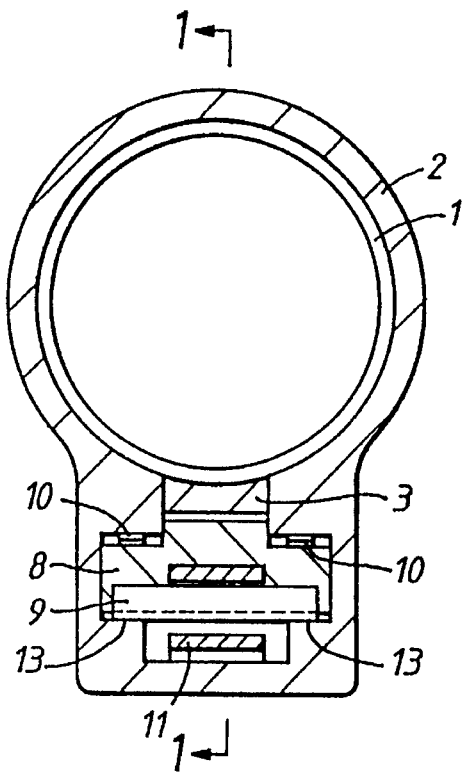
FIG. 2 is an end sectional view taken on the line 2—2 in FIG. 1.
Figure 3:
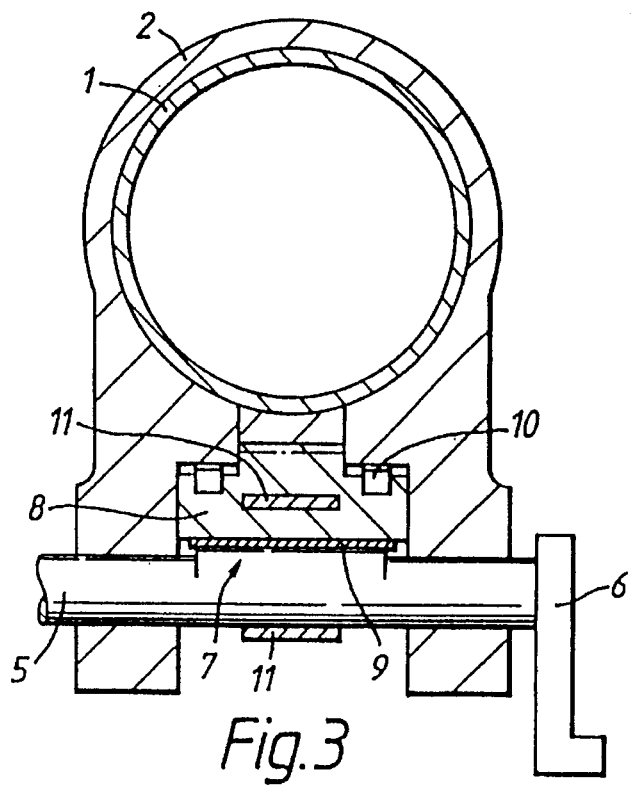
FIG. 3 is an end sectional view taken along the line 3—3 of FIG. 1.

It is an object of the present invention to combine a steering column adjustment mechanism and an energy absorbing steering column collapse mechanism which allows normal steering column adjustment while allowing direct energy absorption in the event of crash regardless of the normal steering column adjustment location.

According to the present invention, there is provided a vehicle steering column adjustment and energy absorbing mechanism comprising a steering column part slidably mounted in a support member, said steering column part carrying first locking means for releasable engagement with second locking means, there being cam means to cause said first and second locking means to engage with one another to lock the steering column relatively to said support member; and said locking means being joined to an energy absorbing device comprising an elongate member arranged around a further member over which said elongate member can be drawn, the arrangement being such that, in normal use, said steering column part can be slidably adjusted relative to said support member and locked in a desired position by said locking means and, in the event of vehicle crash with said first and second locking means locked together, energy imparted to said steering column part moves to cause said locking means to draw said elongate member around said further member, thereby to absorb energy.

The steering column part can be an outer tube or shaft of the steering column. The support member can be a tubular housing which is rigidly attached to the vehicle. The first locking means can be a rack fixed to the steering column part and the second locking means can be a toothed slipper for releasable engagement with the rack.

The cam means can be an integral part of a pivot shaft to which an actuating member, preferably a lever, is attached in order to rotate the cam means to bring the second locking means into and out of engagement with the first locking means. A spring can be interposed between the cam means and the locking means to transfer and distribute force applied by the cam means to the locking means. Resilient means can be provided between the two locking means to urge the second locking means out of engagement with the first locking means when the cam means is positioned to allow this to happen.

Preferably, the elongate member of the energy absorbing device is joined to the second locking means. The energy absorbing elongate member can be a metal strap or wire. The aforesaid further member over which the elongate member can be drawn can be a pin or the like fixed relatively to the support member.

Stop means can be provided to limit adjustment of the steering column part relatively to the support member in which it is mounted. One stop member may be provided by a collapsible tab on the steering column part which, at one adjustment limit comes into contact with part of the support member. Another stop member for an opposite adjustment limit of the steering column part can be provided by the locking means, part of which being arranged to abut the same part of the support member.

Referring to the FIGURES, a vehicle steering column adjustment and energy absorbing mechanism is illustrated which includes a steering column part in the form of a steering column outer tube 1 which is axially slidable in a support member in the form of a housing 2 which is fixed to the body of the vehicle (not shown).

The outer tube 1 carries a first part of a locking means in the form of a fixedly attached toothed rack 3. The tube 1 and rack 3 assembly is free to slide in the housing 2 within a controlled distance which is limited by a stop pin 4 located in the housing 2. Outer adjustment limits of the tube 1 are provided by, in one case the action of an integral tab 1A on the tube 1 contacting the stop pin 4, and in the other case the action of one end of the rack 3 contacting the stop pin 4.

The outer tube 1 is normally clamped in the housing 2 by the locking means which incorporates a pivot shaft 5 operated by a lever 6, the pivot shaft 5 incorporating a cam 7, the cam 7 lifting a toothed slipper 8 into locking engagement with the rack 3. A flat spring 9 is interposed between the cam 7 and toothed slipper 8 to distribute the force applied by the cam 7 over the face of the slipper 8 in which it is in contact. Means (not shown) in the region of the lever 6 is provided releasably to retain the locking mechanism in a locked condition. In this condition, the outer tube 1 and housing 2 become a rigid combination.

The locking mechanism is disengaged by the action of unclamping by moving the lever 6 to rotate the pivot shaft 5 to rotate the cam 7 thereby allowing the toothed slipper 8 to lower. Lowering of the slipper 8 is assisted by resilient means in the form of two springs 10 to ensure complete de-meshing of the teeth of the locking mechanism.

In the event of a frontal impact crash of the vehicle, the steering column is required to collapse at a controlled rate over a specified distance. The rate of collapse is controlled by an energy absorbing device which includes a strap 11 which is secured to the locking means and, in the form illustrated, is secured to the slipper 8. The strap is wrapped around a pin 12 which is located in the housing 2. The strap 11 also is passed under the pivot shaft 5 and extends in the longitudinal direction of the housing 2 (FIG. 1).

The force imparted on the steering column by the driver causes the tube 1 to slide within the housing 2 with the locking means engaged. During this sliding movement, the tube 1, rack 3, slipper 8, springs 10, spring 9 and strap 11 move in unison, the strap 11 unwrapping around the pin 12.

As movement progresses, contact between the spring 9 and cam 7 is lost and the components move onto and along platforms 13 in the housing 2, which ensures continuous meshing of the teeth of the locking means. With this movement, the tag 1A bends away on contact with the stop pin 4.

It will be appreciated that the present construction provides a cam operated mechanism effecting engagement of teeth which causes positive locking of the tube sliding within the tubular housing 2. This is in addition to the normal friction clamping employed. Additionally, the mechanism incorporates an energy absorbing collapse strap which is initially active at any point of column adjustment length, unlike known systems which only become active after the column has collapsed to its shortest adjustment length.

Having described the invention, what is claimed is:

1. A vehicle steering column adjustment and energy absorbing mechanism comprising:

a steering column part slidably mounted in a support member, said steering column part carrying first locking means for releasable engagement with second locking means, there being cam means to cause said first and second locking means to engage with one another to lock the steering column relatively to said support member; and said first and second locking means being joined to an energy absorbing device comprising an elongate member arranged around a further member over which said elongate member can be drawn, the arrangement being such that, in normal use, said steering column part can be slidably adjusted relative to said support member and locked in a desired position by said first and second locking means and, in the event of vehicle crash with said first and second locking means locked together, energy imparted to said steering column part moves said steering column part to cause said first and second locking means to draw said elongate member around said further member, thereby to absorb energy; and means for maintaining said first and second locking means in locking engagement in the event of a vehicle crash.

2. The mechanism according to claim 1, wherein the means for maintaining the first and second locking means in locking engagement comprises the support member having a platform portion.

3. The mechanism according to claim 2, wherein the platform portion of the support member comprises a raised portion of the support member.

4. The mechanism according to claim 1, in which said steering column part is an outer tube or shaft of the steering column.

5. The mechanism according to claim 1, wherein said support member is a tubular housing for rigid attachment to the vehicle.

6. The mechanism according to claim 1, wherein said first locking means is a rack fixed to said steering column part and said second locking means is a toothed slipper for releasable engagement with said rack.

7. The mechanism according to claim 1, wherein said cam means is an integral part of a pivot shaft to which an actuating member is attached in order to rotate the cam means to bring said second locking means into and out of engagement with said first locking means.

8. The mechanism according to claim 1, wherein a spring is interposed between said cam means and said second locking means to transfer and distribute force applied by said cam means to said second locking means.

9. The mechanism according to claim 1, wherein resilient means is provided between said first and second locking means to urge said second locking means out of engagement with said first locking means when the cam means is positioned to allow this to happen.

10. The mechanism according to claim 1, wherein said elongate member of the energy absorbing device is joined to said second locking means.

11. The mechanism according to claim 1, wherein said energy absorbing elongate member is a metal strap.

12. The mechanism according to claim 1, wherein said energy absorbing elongate member is a metal wire.

13. The mechanism according to claim 1, wherein said further member over which said elongate member can be drawn is a pin fixed relatively to said support member.

14. The mechanism according to claim 1, wherein stop means is provided to limit adjustment of the steering column part relatively to said support member in which it is mounted.

15. The mechanism according to claim 1, wherein said stop means comprises a stop member provided by a collapsible tab on said steering column part which, at one adjustment limit comes into contact with part of said support member.

16. The mechanism according to claim 15, wherein said stop means comprises a second stop member for an opposite adjustment limit of said steering column part, said second stop member being provided by said first locking means, part of which being arranged to abut the same part of said support member as the first stop member.

17. A vehicle steering column adjustment and energy absorbing mechanism comprising:

a steering column support member;

a steering column part slidably mounted in the support member;

a first locking means connected to the steering column part;

a second locking means in releasable engagement with the first locking means;

a cam means for compelling the first and second locking means into locking engagement, thereby locking the steering column part relative to the support member;

a means for absorbing energy imparted to the vehicle steering column by impact of a vehicle driver on a steering column wheel in the event of a vehicle crash, the means for absorbing energy being connected to the second locking means; and a means for maintaining the first and second locking means in locking engagement in the event of a vehicle crash, the steering column part, the first locking means and the second locking means all moving relative to the support member in the event of a vehicle crash.

18. The mechanism according to claim 17, wherein the means for absorbing energy comprises an elongate member arranged around a pin member over which the elongate member can be drawn in the event of a vehicle crash.

19. The mechanism according to claim 18, wherein the means for maintaining the first and second locking means in locking engagement comprises the support member having a platform portion.

20. The mechanism according to claim 19, wherein the platform portion of the support member comprises a raised portion of the support member.

* * * * *